T. A. H. CAMERON.
PORTABLE FENCE.
No. 179,519.  Patented July 4, 1876.
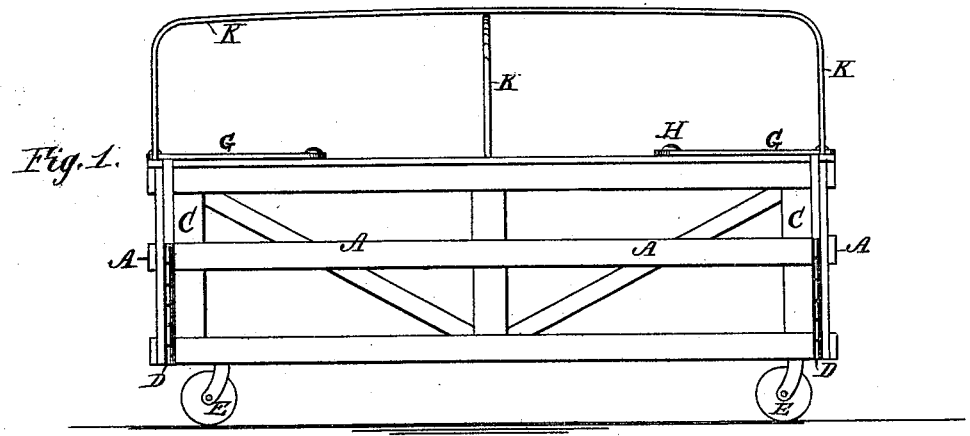
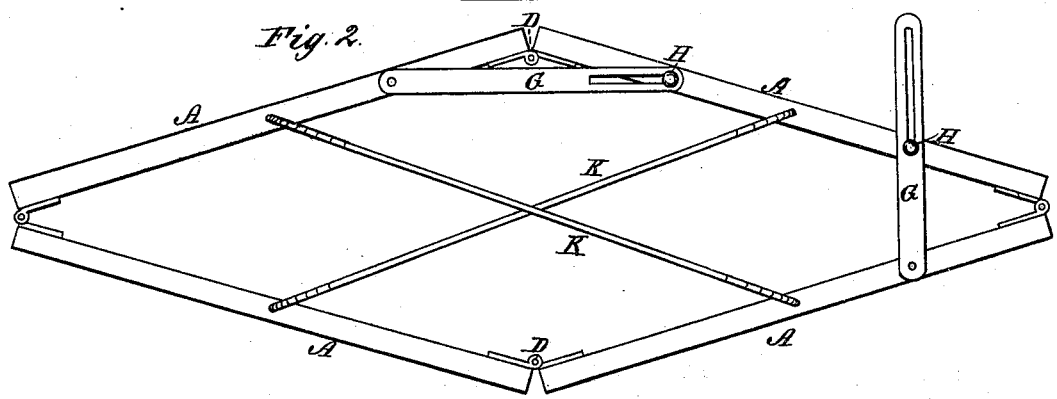
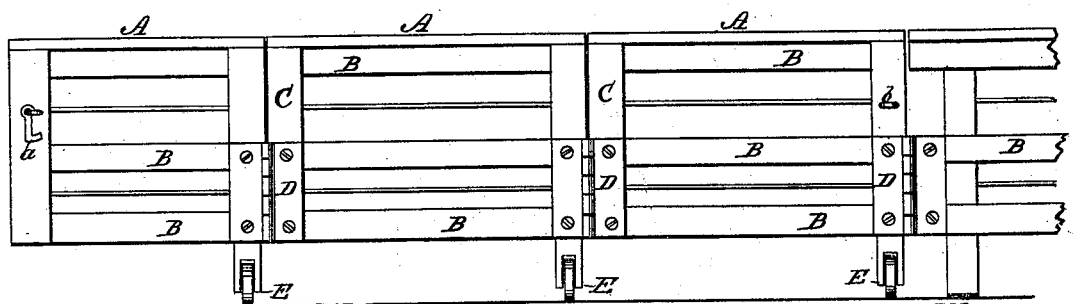
WITNESSES:
W. W. Hollingsworth
C. J. Kenno
INVENTOR:
T. A. H. Cameron
BY
ATTORNEYS.

UNITED STATES PATENT OFFICE.

TILMON A. H. CAMERON, OF PETRA, MISSOURI.

IMPROVEMENT IN PORTABLE FENCES.

Specification forming part of Letters Patent No. 179,519, dated July 4, 1876; application filed June 27, 1876.

*To all whom it may concern:*

Be it known that I, TILMON A. H. CAMERON, of Petra, in the county of Saline and State of Missouri, have invented a new and Improved Portable Fence; and I do hereby declare that the following is a full, clear, and exact description of the same.

The invention is a portable fence, designed to form a yard or inclosure for stock. It is composed of sections or panels, which are hinged together, mounted on caster-wheels, and provided with braces for holding the panels in the desired relative position. The fence is thus adapted to be readily shifted from one part of a field to another, and to be adjusted in a hollow square or other form, according to the nature of the field or configuration of the grazing-surface.

The invention further relates to providing supports for an awning, which are self-adjusting and fold together with the panels, as hereinafter described.

In the accompanying drawing, forming part of this specification, Figure 1 is a side view of the fence, arranged to form a rectangular pen or inclosure. Fig. 2 is a plan view, showing the panels and connected parts adjusted for passing through a gateway; Fig. 3, an inner side view of the connected panels extended in line and attached to a stationary fence.

The several panels A of the fence are composed of parallel longitudinal boards or bars B and vertical end bars C. The panels are connected by hinges D, and supported upon caster-wheels E. The fence may be adjusted to form a pen or inclosure, as shown in Fig. 1, for horses or other stock, the end panels being, in such case, secured together by a hook, *a*, and staple *b*.

The form of the pen may be changed at will, according to the configuration of the grass land, or as other conditions require, the caster-wheels enabling this to be done with ease and dispatch. The fence is likewise adapted to pass through a gateway for the purpose of changing it from one field to another. In such case the panels may be extended in a single line, or may be brought near together in pairs, thus forming a double line, as in Fig. 2.

To cause the pen to retain the desired form, I employ slotted brace-bars G, extending across from one panel to another, and secured by clamp-bolts H. It is apparent that by loosening the nuts of bolts H, or removing said bolts altogether, the panels may be adjusted by moving them nearer each other, or farther apart, as desired.

A canvas awning, for protecting the grazing animals from sun or rain, may be supported upon bent rods K, whose ends are pivoted to different panels, so that when the latter are adjusted to change the form of the pen the rods will likewise adjust themselves correspondingly.

The ends of each rod are made detachable, to enable the panels to be extended in a straight line, as when connected to another (stationary) fence, as in Fig. 3.

What I claim is—

1. The improved portable fence, composed of panels, hinged together and provided with caster-wheels and adjustable braces, as shown and described.

2. The rods for supporting the awning to different panels, so that they may adjust themselves with the panels, as shown and described.

TILMON A. H. CAMERON.

Witnesses:
A. W. HART,
SOLON C. KEMON.